United States Patent
Morita et al.

(10) Patent No.: US 11,628,839 B2
(45) Date of Patent: Apr. 18, 2023

(54) VEHICLE CONTROL DEVICE TO REDUCE SPEED OF A VEHICLE

(71) Applicant: HONDA MOTOR CO., LTD., Tokyo (JP)

(72) Inventors: Jumpei Morita, Wako (JP); Masakazu Obi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 17/189,483

(22) Filed: Mar. 2, 2021

(65) Prior Publication Data
US 2021/0291834 A1    Sep. 23, 2021

(30) Foreign Application Priority Data

Mar. 19, 2020 (JP) .............................. JP2020-048911

(51) Int. Cl.
*B60W 30/00* (2006.01)
*B60W 30/18* (2012.01)
*B60W 40/105* (2012.01)

(52) U.S. Cl.
CPC .... *B60W 30/18109* (2013.01); *B60W 30/181* (2013.01); *B60W 40/105* (2013.01); *B60W 2554/20* (2020.02); *B60W 2554/40* (2020.02); *B60W 2554/802* (2020.02); *B60W 2720/106* (2013.01)

(58) Field of Classification Search
CPC ......... B60W 30/18109; B60W 30/181; B60W 40/105; B60W 2554/20; B60W 2554/802; B60W 2554/40; B60W 2720/106
See application file for complete search history.

(56) References Cited

U.S. PATENT DOCUMENTS

| 2017/0144661 A1* | 5/2017 | Miller | B60W 30/143 |
| 2018/0162392 A1* | 6/2018 | Takaki | B60W 30/09 |
| 2019/0019412 A1* | 1/2019 | Roca | G08G 1/166 |
| 2020/0039481 A1* | 2/2020 | Aitidis | B60T 7/12 |
| 2021/0355738 A1* | 11/2021 | Jang | E05F 15/73 |

FOREIGN PATENT DOCUMENTS

| JP | 2014-034289 A | 2/2014 | |
| JP | 2014034289 A * | 2/2014 | ............ B60R 21/00 |

OTHER PUBLICATIONS

K. Min and J. Choi, "A Control System For Autonomous Vehicle Valet Parking" 2013 (Year: 2013).*

* cited by examiner

*Primary Examiner* — Elaine Gort
*Assistant Examiner* — Brittany Renee Peko
(74) *Attorney, Agent, or Firm* — Thomas | Horstemeyer, LLP

(57) ABSTRACT

A vehicle control device comprises a unit to detect a distance to an obstacle; a unit to detect a speed of the vehicle; and a reduction support unit to, based on the speed and the distance, perform support for reduction of a speed of the vehicle. The reduction support unit changes the distance at which the reduction support is to be performed between a case where driving during parking and a case where not driving during parking. The distance at which the reduction support is to be performed is, for a first speed range, longer in a case where driving during parking than in a case where not driving during parking, and, for a second speed range, longer in a case where not driving during parking than in a case where driving during parking.

7 Claims, 4 Drawing Sheets

FIG. 4

| VEHICLE SPEED [Km/h] | BRAKE INSTRUCTION DISTANCE (ONLY AEB) [cm] | BRAKE INSTRUCTION DISTANCE (WHEN PARKING) [cm] |
| --- | --- | --- |
| 0 | 0 | 0 |
| 1 | 0 | 25 |
| 2 | 0 | 35 |
| 3 | 70 | 45 |
| 4 | 80 | 80 |
| 5 | 90 | 90 |
| 6 | 100 | 100 |
| 7 | 120 | 120 |
| 8 | 120 | 120 |
| 9 | 120 | 120 |
| 10 | 120 | 120 |
| 11 | CONTROL BASED ON TTC | CONTROL BASED ON TTC |

VEHICLE CONTROL DEVICE TO REDUCE SPEED OF A VEHICLE

CROSS-REFERENCE TO RELATED APPLICATION(S)

This application claims priority to and the benefit of Japanese Patent Application No. 2020-048911 filed on Mar. 19, 2020, the entire disclosure of which is incorporated herein by reference.

BACKGROUND OF THE INVENTION

Field of the Invention

The present invention relates to a vehicle control device and a vehicle in which the vehicle control device is mounted.

Description of the Related Art

One automobile driving assistance function is an automatic emergency brake (abbreviated as AEB). An AEB is a device for detecting the possibility of a collision with an obstacle such as another vehicle, warning the driver in response to the detection, and reducing the vehicle speed by applying the brake, with the objective of avoiding a collision or reducing an impact.

There are cases, such as when parking, where a vehicle is driven in a location where there are many obstacles such as other vehicles. Smooth driving may be impeded by the AEB operation when parking. Accordingly, techniques that distinguish between driving when parking and normal driving, and that change AEB operation criteria accordingly have been proposed (refer to Japanese Patent Laid-Open No. 2014-34289 (in particular, claim 3)).

However, in Japanese Patent Laid-Open No. 2014-34289, a collision is determined in the case where the distance between the self-vehicle (also referred to as the ego-vehicle) and an obstacle is less than a reference distance, and the reference distance in the case where it is determined that the vehicle is being driven during parking is made to be smaller than during normal driving. Accordingly, since the reference distance is uniformly shortened during driving when parking, there are cases where the driver is made to feel uncomfortable by the speed when the AEB operates. For example, there are cases where the driver will feel as the timing at which the AEB operates is delayed when the AEB operates at a certain timing. Such a timing misalignment may cause the driver to feel uncomfortable, and in particular destroy the driving operation rhythm that has come to be routine.

SUMMARY OF THE INVENTION

The present invention provides a vehicle control device and a vehicle that enable control that avoids making the driver feel uncomfortable by setting the distance at which the function for reducing the vehicle speed operates in accordance with the speed of the vehicle.

The present invention has the following configuration. That is, according to one aspect of the present invention, a vehicle control device operable to reduce an approach between a vehicle and an obstacle, the device comprising: a distance detection unit configured to detect a distance to an obstacle; a speed detection unit configured to detect a speed of the vehicle; and a reduction support unit configured to, based on the speed and the distance to the obstacle, perform support for reduction of a speed of the vehicle, wherein the reduction support unit changes the distance at which the reduction support is to be performed between a case where driving during parking and a case where not driving during parking, and the distance at which the reduction support is to be performed is, for a first speed range, longer in a case where driving during parking than in a case where not driving during parking, and, for a second speed range, longer in a case where not driving during parking than in a case where driving during parking is provided.

By virtue of the present invention, it is possible to enable control that avoids making the driver feel uncomfortable by setting the distance at which the function for reducing the vehicle speed operates in accordance with the speed of the vehicle.

BRIEF DESCRIPTION OF THE DRAWINGS

FIG. 4 is a view that illustrates an example of an AEB operation map for speed reduction.

DESCRIPTION OF THE EMBODIMENTS

Figure 1:
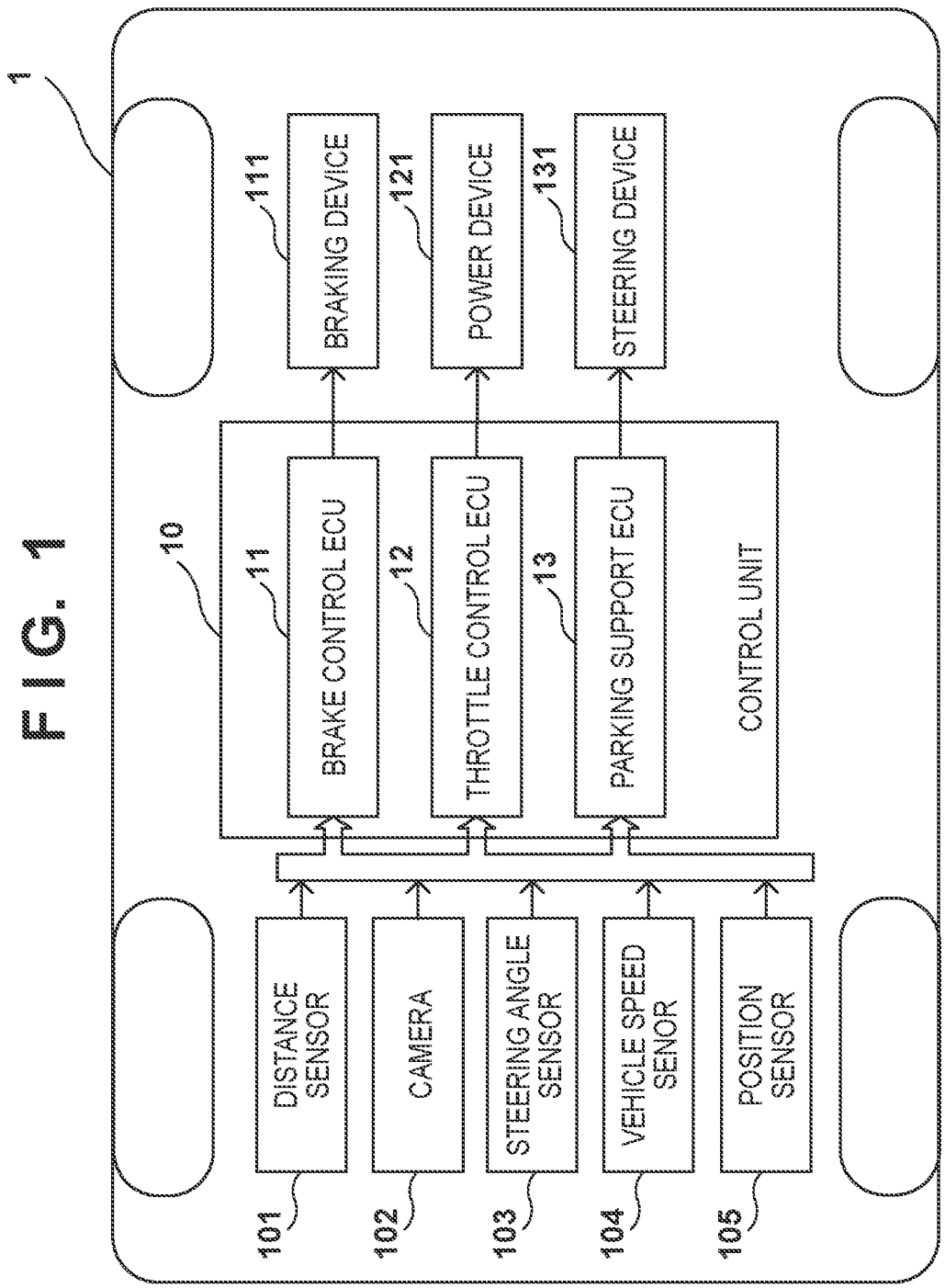
FIG. 1 is a block diagram that illustrates an example of a driving assist system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

System Configuration

In FIG. 1, a driving assist system of the embodiment, and in particular, a block diagram of a system that has automatic emergency brake and parking support control functions is illustrated. In FIG. 1, a control unit 10 controls driving of a vehicle 1. The control unit 10 applies braking to the vehicle by controlling a braking device 111, and a brake control ECU 11 which is for reducing the speed is included therein. The brake control ECU 11 performs vehicle speed reduction support, for example automatic emergency brake (AEB) control. Also, a parking support ECU 13 which supports reverse parking, parallel parking, and steering during parking is also included in the control unit 10. The parking support control function performs only steering control, and entrusts throttle and brake operations, and the switching of advancing and reversing to the driver. Therefore, the parking support ECU 13 controls a steering device 131 which may be for electric power steering or the like. A throttle control ECU 12 controls a power device 121 such as an engine or an electric motor. There is no throttle in an electric motor, but control of the output of the electric motor is also referred to as throttle control. The throttle control ECU 12 reduces the speed by reducing the drive of a power device during an AEB operation. Note that these ECUs need not be independent for each function, and for example, configuration may be taken such that the functions of each ECU illustrated in FIG. 1 are fulfilled by one or more ECUs. Each ECU (Electronic Control Unit) includes a processor that is typified by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces and the like.

In the automatic emergency brake and parking support control, driving support control is performed based on input from respective sensors that detect an external state or a state of the vehicle. The respective sensors include the following: a distance sensor 101, a camera 102, a steering angle sensor 103, a vehicle speed senor 104, and a position sensor 105.

The distance sensor 101 may be a sonar for detecting a distance to an obstacle by an ultrasonic wave or the like, the sensor being attached to the front and back and the four corners of the vehicle, for example. The camera 102 may be attached to a top-center part of the windshield, for example, and capture images of the outside through the windshield. It is possible to detect a distance to an obstacle from an image of the camera 102. During low speed driving such as driving when parking, the distance may be measured by the distance sensor 101 rather than employing the camera 102 for distance measurement. Of course, the camera 102 may also be used.

The steering angle sensor 103 detects a direction that the front wheels are oriented in or a rotational position of a steering shaft. A parking support system 13 controls the steering device 131 so that the steering angle detected by the steering angle sensor 103 becomes a target steering angle. The vehicle speed senor 104 detects the current speed of the vehicle 1. The vehicle speed senor 104 may directly detect the travel speed of the vehicle 1, and may detect the speed at which the wheels are rotating and convert that into the speed of the vehicle. The position sensor 105 may be, for example, a global positioning system (GPS) receiver. If the position can be identified by the position sensor 105, it is possible to determine that the current position is, for example, a parking lot by verifying map information (not shown) that the vehicle 1 has.

AEB Operation Map

The brake control ECU 11 performs an AEB operation, for each travel speed of the self-vehicle, in accordance with a table that indicates a reference distance to an obstacle at which to cause the AEB to operate (referred to as an AEB operation map for convenience in the embodiment). FIG. 4 illustrates an example of the AEB operation map. In FIG. 4, the left column indicates the vehicle speed. In FIG. 4, the mapping is from the speed 0 (stopped) to 10 Km/h for each 1 Km/h. At the speed 11 Km/h, rather than AEB control according to the distance to the obstacle that will be described in the embodiment, control based on the predicted time till a collision (TTC) is switched to.

A middle column indicates an AEB operation distance during normal driving, that is during driving when not parking. In the example of FIG. 4, when the speed is 0 Km/h to 2 Km/h, the AEB operation distance is 0, that is, the AEB does not operate. When the speed is 3 Km/h, the operating distance is 70 cm, and from then until 6 Km/h, the operating distance is extended by 10 cm each time the speed increases by 1 Km/h. When the speed is 7 Km/h to 10 Km/h, the AEB operating distance is fixed at 120 cm.

The right column in FIG. 4 indicates the AEB operation distance for driving when parking. In the example of FIG. 4, when the speed is 0 Km/h, the AEB operation distance is 0, specifically the AEB does not operate. When the speed is 1 Km/h, the operating distance is 25 cm, and from then until 3 Km/h, the operating distance is extended by 10 cm each time the speed increases by 1 Km/h. When the speed is 4 Km/h to 10 Km/h, the AEB operating distance is the same as it is during normal driving.

Accordingly, when the speed is in the range of 1 to 2 Km/h, the AEB operating distance in the case of driving when parking is larger than the operating distance in the case of normal driving. When the speed is in the range of 3 Km/h, the AEB operating distance in the case of driving when parking is smaller than the operating distance in the case of normal driving. Accordingly, better safety can be ensured by causing AEB to operate when driving during parking even in a speed range in which AEB does not operate during normal driving. On the other hand, at 3 Km/h which is a higher speed range in which AEB operates even during normal driving, the AEB operating distance when driving during parking is smaller than normal driving. By this, the operation is made to feel natural to the driver by extending gradually the AEB distance from the low-speed region during parking, and the AEB does not operate when it is not expected to. Accordingly, the driver is not made to feel uncomfortable. The AEB operation map illustrated in FIG. 4 is held in the brake control ECU 11, for example, and is switched/referenced in accordance with the situation for normal driving and for driving during parking.

AEB Operation Map Switching Processing

Figure 2:
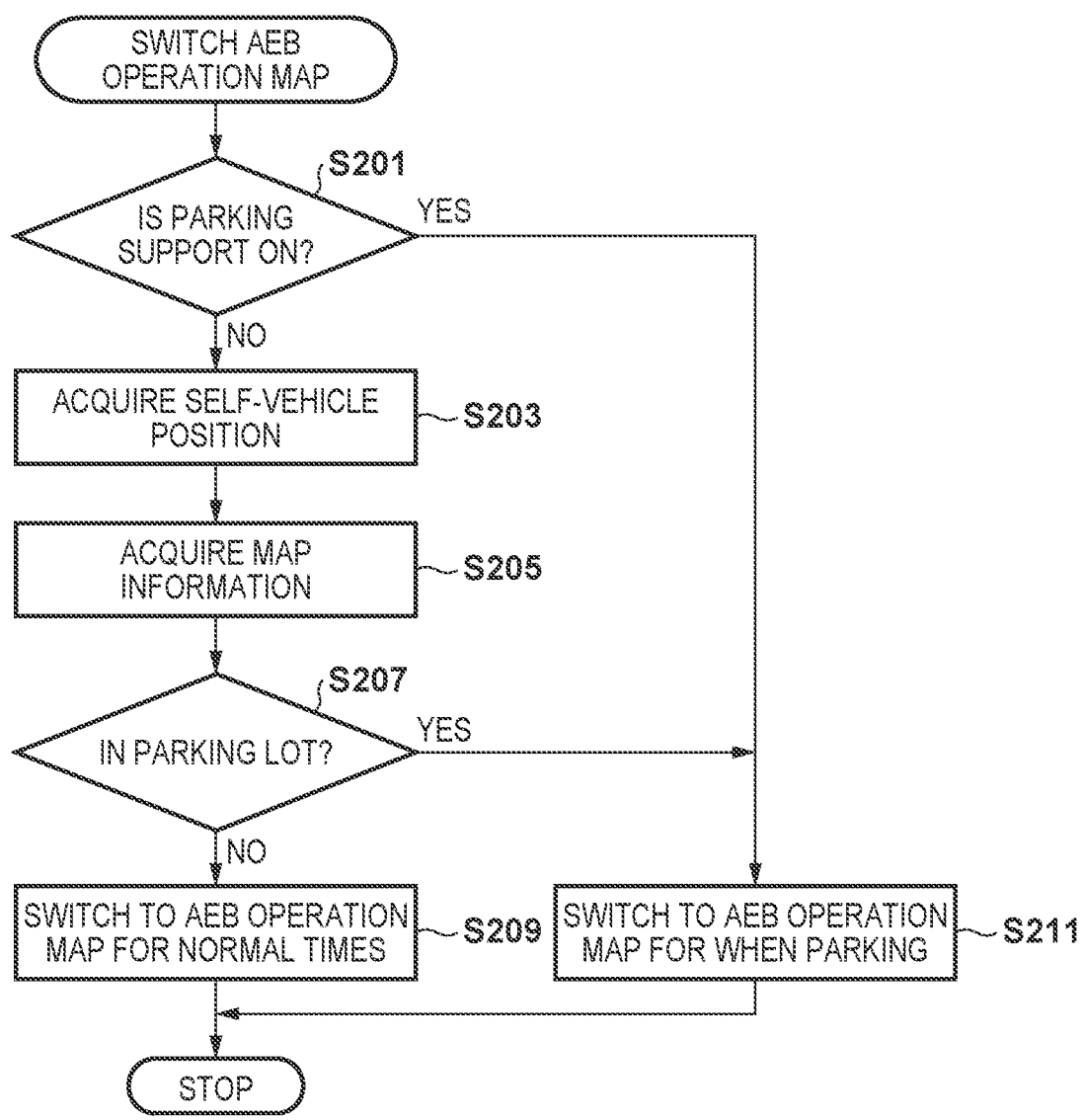
FIG. 2 is a flowchart for describing a procedure for switching an AEB operation map for speed reduction.

An example of a procedure in which the AEB operation map is switched in the case of normal driving and the case of driving during parking is illustrated in FIG. 2. This procedure may be performed by the brake control ECU 11, for example. Also, the procedure of FIG. 2 may be repeatedly executed every fixed amount of time, such as every one second, for example. First, it is determined whether the parking support control function is on (step S201). The parking support control function operates when for example the driver performs an operation to cause the parking support control function to operate. If the parking support control function is not on, the self-vehicle position is acquired by the position sensor 105 (step S203). Also, the map information is obtained (step S205). Then, the self-vehicle position and the map information are verified, and it is determined whether the current location is within the parking lot (step S207). If the parking support control function is off and the current location is not within a parking lot, it is estimated to be normal driving. Accordingly, the AEB operation map that is referenced in that case is switched to the AEB operation map for normal driving (step S209). In step S209, for example, the AEB operation map for normal driving is loaded as a reference AEB operation map.

In a case where the parking support control function is determined to be on in step S201, or the current position is determined to be within a parking lot in step S207, it is estimated to be driving during parking. Accordingly, the AEB operation map to be referenced in that case is switched to the AEB operation map for operation during parking (step S211). In step S211, the AEB operation map for operation during parking, for example, is loaded as the AEB operation map for reference.

Note that configuration may be taken so as to separately execute step S211 triggered by the parking support control function being turned on, without performing step S201 in FIG. 2. Also, configuration may be taken to branch to step S209 directly in the case where the parking support control function is off in step S201. In other words, the AEB operation map for driving when parking may be used, limiting to the case where the parking support control function is on.

Brake Control

Figure 3:
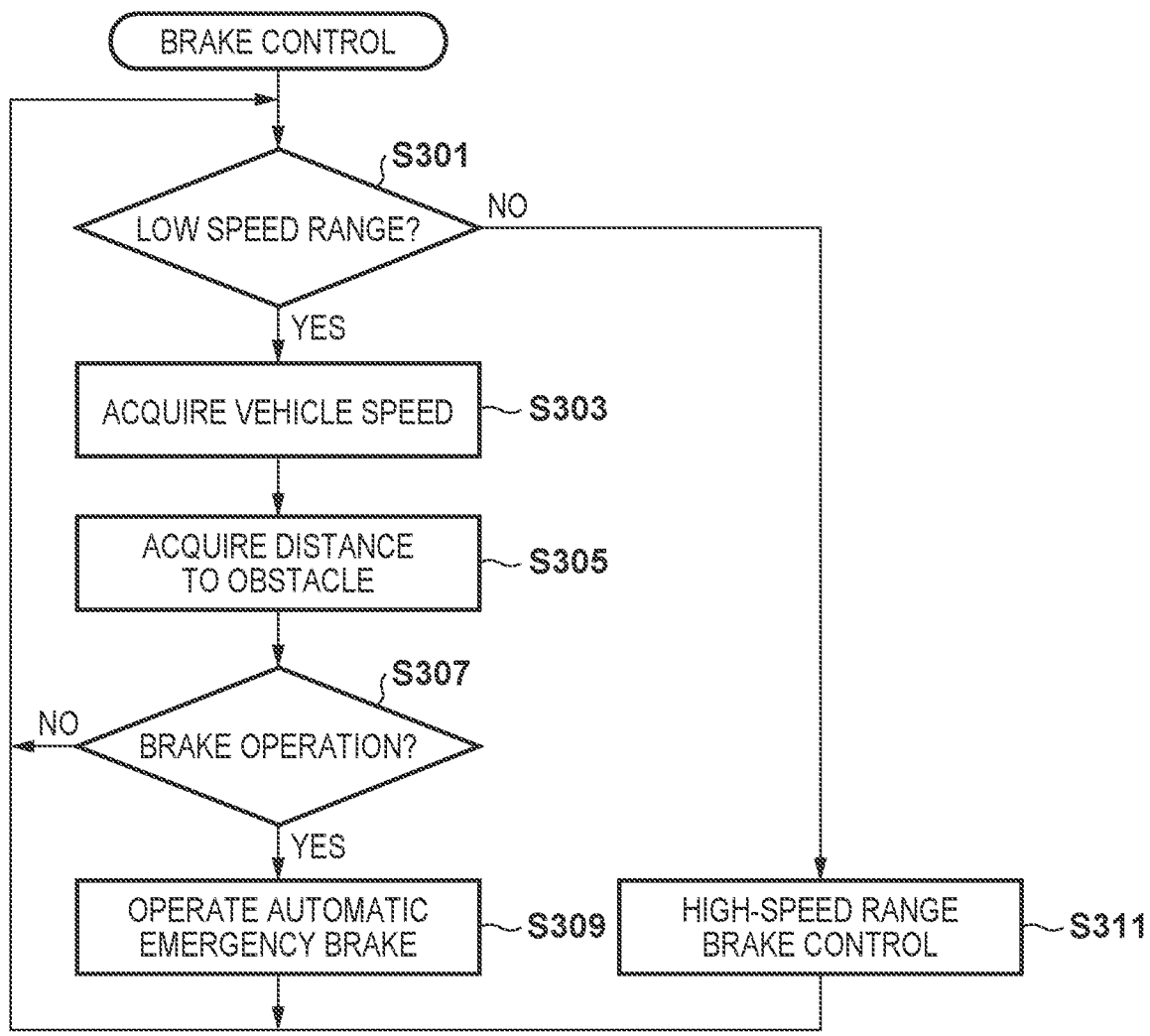
FIG. 3 is a flowchart for describing a procedure during a speed reduction operation.

FIG. 3 illustrates an example of an AEB operation procedure. The procedure of FIG. 3 may be performed by the brake control ECU 11, for example. First, it is determined whether the current speed is in a low speed range (step S301). The low speed region is a speed region in which AEB operates in accordance with the speed and the distance to an obstacle, and in the example of FIG. 4, the speed range is 0 to 10 Km/h. That is, the current speed may be determined in step S301 to be 10 Km/h or less in the case of FIG. 4. In the case where it is determined to be within the low speed range, the vehicle speed is acquired (step S303) again from the vehicle speed senor 104, and furthermore the distance from the distance sensor 101 to the obstacle is acquired (step S305). Note that the distance to the obstacle acquired here may be a value that is acquired from a front distance sensor during forward movement and from a rear distance sensor during backward movement.

Next, it is determined whether the brake is caused to operate, specifically whether the condition for causing the AEB to operate has been satisfied (step S307). This determination is performed with reference to a reference AEB operation map. For example, configuration may be taken to, in a case where the operating distance corresponding to the current vehicle speed is referenced, and the distance to an obstacle is smaller than that value, determine that the condition for causing the AEB to operate is satisfied. Note that in the case where the distance to an obstacle is acquired from each of a plurality of distance sensors, a determination may be made using a minimum value from among those. For example, when an AEB operation map for when parking is referenced, if the current speed is 2 Km/h and the minimum distance to an obstacle is 30 cm, it can be determined that the condition for causing AEB to operate has been satisfied. Meanwhile, even if the speed and the distance are the same (i.e., the speed is 2 Km/h and the distance is 30 cm), when the AEB operation map for normal times is referenced, the condition for causing AEB to operate is determined to not be satisfied. Also, for example, when an AEB operation map for when parking is referenced, if the current speed is 3 Km/h and the minimum distance to an obstacle is 60 cm, it can be determined that the condition for causing AEB to operate has not been satisfied. Meanwhile, even if the speed and the distance are the same (i.e., the speed is 3 Km/h and the distance is 60 cm), when the AEB operation map for normal times is referenced, the condition for causing AEB to operate is determined to be satisfied.

In a case where it is determined in step S307 that the condition for causing AEB to operate is satisfied, the automatic emergency brake is caused to operate (step S309). At this time, configuration may be taken to stop output of the power device in conjunction with the throttle control ECU 12. Also, in place of stopping the power, the clutch may be disengaged in the case of an internal combustion engine. Meanwhile, in the case where it is determined in step S301 that it is not the low speed range, speed reduction support for a high-speed range, for example brake control is performed (step S311). Description of this brake control will be omitted here. The procedure for this brake control is executed repeatedly during the travelling of the vehicle.

Effect of the Embodiment

By the above configuration, in the case of driving when parking and in the case of normal driving when not in a parking lot, the AEB operation map is switched, and then AEB control is performed. By this, it is possible to perform AEB control suitable to an environment where the speed is low and the obstacles are many during parking. Furthermore, rather than uniformly making the AEB operating distance during parking smaller, depending on the speed, the AEB operating distance is made larger than at normal times within a low speed range, and the AEB operating distance is made smaller than normal times in a high-speed range that is for higher speeds than the low-speed range. By this, it is possible to realize AEB control for a low speed range without causing the driver to feel uncomfortable. Also, this is not limited to AEB, and it is similar for warnings to the driver.

Other Embodiments

Note that while the above-described embodiment gives an example in which the brakes are applied in the vehicle by causing AEB, in other words the automatic emergency brake, to operate, configuration may be taken so as to warn the driver in place of braking by the automatic emergency brake. Alternatively, the driver may be warned in addition to braking by the automatic emergency brake. Also, the parking support control function described in the embodiment only performs steering control, but the present invention may be applied even in the case where a parking support function that automates acceleration and deceleration is used. In such a case as well, it is possible to perform processing of a distance threshold at which AEB is to operate in relation to an obstacle, in accordance with whether or not the location is a parking lot, for example.

Summary of Embodiments

The above-described embodiments are summarized as follows.

(1) By virtue of a first embodiment of the present invention, a vehicle control device operable to reduce an approach between a vehicle and an obstacle, the device comprising:

a distance detection unit configured to detect a distance to an obstacle;

a speed detection unit configured to detect a speed of the vehicle; and a reduction support unit configured to, based on the speed and the distance to the obstacle, perform support for reduction of a speed of the vehicle, wherein the reduction support unit changes the distance at which the reduction support is to be performed between a case where driving during parking and a case where not driving during parking, and the distance at which the reduction support is to be performed is, for a first speed range, longer in a case where driving during parking than in a case where not driving during parking, and, for a second speed range, longer in a case where not driving during parking than in a case where driving during parking, is provided.

By this configuration, it is possible to realize vehicle speed reduction support that does not make the driver feel uncomfortable.

(2) By virtue of a second embodiment of the present invention, the vehicle control device described in (1), wherein the first speed range is a lower speed range than the second speed range, is provided.

By this configuration, by increasing the speed-reduction-support operating distance more during driving when parking in the lower speed range, and doing the inverse in the higher speed range, it is possible to realize vehicle speed reduction support without causing the driver to feel uncomfortable when parking.

(3) By virtue of a third embodiment of the present invention, the vehicle control device according to (2), wherein at a speed higher than the second speed range, the distance at which the reduction support is to be performed is the same in a case where driving during parking and in a case where not driving during parking, is provided.

By virtue of this configuration, it is possible to realize vehicle speed reduction support that does not cause the driver to be uncomfortable by, even when parking, performing the same control as at normal times in a speed range that is not particularly slow.

(4) By virtue of a fourth embodiment of the present invention, the vehicle control device described in any one of (1) through (3), wherein the reduction support unit determines the driving during parking in a case where a parking support function is operating, is provided.

By virtue of this configuration, it is possible to realize speed reduction support that is not uncomfortable when the parking support function is used.

(5) By virtue of the fifth embodiment of the present invention, the vehicle control device according to any one of (1) through (4), wherein the reduction support unit determines the driving during parking in a case where a location of the vehicle is within a parking lot, is provided.

By virtue of this configuration, speed reduction support that is not uncomfortable can be realized during manual parking within a parking lot.

(6) By virtue of a sixth embodiment of the present invention, the vehicle control device according to (1) through (5), wherein the reduction support unit, as the reduction support, performs at least one of reducing speed by applying braking in the vehicle and warning a driver, is provided.

By virtue of this configuration, it is possible to realize reduction support by performing at least one of reducing the vehicle speed and warning the driver.

(7) By virtue of a seventh embodiment of the present invention, a vehicle in which the vehicle control device according to (1) through (6) is mounted is provided.

By this configuration, it is possible to provide a vehicle that performs speed reduction support that is not uncomfortable during parking and during normal driving.

The invention is not limited to the foregoing embodiments, and various variations/changes are possible within the spirit of the invention.

What is claimed is:

1. A vehicle control device operable to reduce an approach between a vehicle and an obstacle, the device comprising:
    a distance detection unit configured to detect a distance to an obstacle;
    a speed detection unit configured to detect a speed of the vehicle; and
    a reduction support unit configured to, based on the speed and the distance to the obstacle, perform support for reduction of a speed of the vehicle,
    wherein
    the reduction support unit changes the distance at which the reduction support is to be performed between a parking mode and a normal driving mode, and
    the distance at which the reduction support is to be performed is longer during the parking mode compared to the normal driving mode, for a first speed range; and the distance at which the reduction support is to be performed is longer during the normal driving mode compared to the parking mode, for a second speed range that is higher speed range than the first speed range.

2. The vehicle control device according to claim 1, wherein
    at a speed higher than the second speed range, the distance at which the reduction support is to be performed is the same in a case where driving during parking and in a case where not driving during parking.

3. The vehicle control device according to claim 1, wherein
    the reduction support unit determines the driving during parking in a case where a parking support function is operating.

4. The vehicle control device according to claim 1, wherein
    the reduction support unit determines the driving during parking in a case where a location of the vehicle is within a parking lot.

5. The vehicle control device according to claim 1, wherein
    the reduction support unit, as the reduction support, performs at least one of reducing speed by applying braking in the vehicle and warning a driver.

6. A vehicle in which a vehicle control device operable to reduce an approach between a vehicle and an obstacle is mounted, wherein
    the vehicle control device comprises:
    a distance detection unit configured to detect a distance to an obstacle;
    a speed detection unit configured to detect a speed of the vehicle; and
    a reduction support unit configured to, based on the speed and the distance to the obstacle, perform support for reduction of a speed of the vehicle,
    wherein
    the reduction support unit changes the distance at which the reduction support is to be performed between a parking mode and a normal driving mode, and
    the distance at which the reduction support is to be performed is longer during the parking mode compared to the normal driving mode, for a first speed range; and the distance at which the reduction support is to be performed is longer during the normal driving mode compared to the parking mode, for a second speed range that is higher speed range than the first speed range.

7. The vehicle control device according to claim 1, wherein
    the vehicle is in the parking mode when a parking support control function is on or a position of the vehicle is within a parking lot, and
    the vehicle is in the normal driving mode when not in the parking mode.

* * * * *